Figure 1:
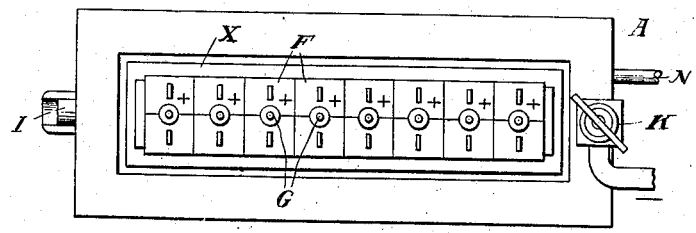

H. S. BLACKMORE.
PROCESS OF REDUCING METAL.
APPLICATION FILED MAR. 5, 1909.

918,950.

Patented Apr. 20, 1909.

UNITED STATES PATENT OFFICE.

HENRY SPENCER BLACKMORE, OF MOUNT VERNON, NEW YORK.

PROCESS OF REDUCING METAL.

No. 918,950.  Specification of Letters Patent.  Patented April 20, 1909.

Original application filed September 24, 1907, Serial No. 394,368. Divided and this application filed March 5, 1909. Serial No. 481,260.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Reducing Metal, of which the following is a specification.

This invention relates to the reduction of metals, and is a division of an application filed by me September 24, 1907, Serial No. 394,368, which is a division of an application filed by me September 23, 1904, Serial No. 225,642, and which application is a division of my original application filed April 18, 1903, Serial No. 153,329, of which original application the present application is also a division; and said invention includes the subject matter revealed and claimed in Letters Patent of the United States, granted to me May 28, 1901, Patent No. 675,190, and October 22, 1901, No. 685,198, and May 6, 1902, No. 699,282, augmented by the action of an electric current, and also matter revealed in Patent Number 881,049 issued March 3rd, 1908.

The object of my invention is to reduce metal from its compounds or compositions by thermo-chemical means and perform electrolysis of compounds in such a manner that a saving of electric current is effected and the electrolysis is facilitated and accomplished economically as compared with methods employed hitherto, and consists in employing as electrodes substances containing metal and carbon, either as carbid, acetylid, or other metal-carbon-containing compound or union, in which condition either the metal or carbon content, or both, have a natural affinity for the electro-negative constituent of the compound to be electrolyzed, which affinity, when exercised during electrolysis, augments the applied electric current to such a degree that the process may be carried on readily with great saving.

As an illustration of my invention I will take for example the reduction of aluminium from its oxy-fluorid or mixture of oxid and fluorid.

I place a mixture of aluminium oxid and fluorid in a carbon lined reduction pot, such as is usually employed for electric smelting, and pass a current of electricity therethrough, employing as anode calcium carbid, which is readily produced at high temperatures, in an electric furnace by previous treatment. As the current of electricity passes through the mixture of aluminium oxid and fluorid it assumes a molten condition, which fluidity may be increased by addition of calcium chlorid; when the mass has assumed a fluid condition, electrolysis commences, the electro-negative constituents, fluorin and oxygen being liberated at the anode and aluminium at the cathode, which constitutes the interior of the reduction pot or receptacle. The fluorin and oxygen liberated at the anode immediately combine with the calcium carbid, producing carbonic oxid which escapes as a gas, and calcium fluorid, liberating metallic aluminium from the aluminium fluorid and oxid in accordance with the following reaction:

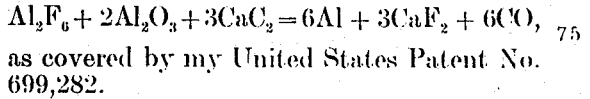

as covered by my United States Patent No. 699,282.

I can substitute other metal carbid or any other practical carbid or metal-carbon-containing compound for the calcium carbid, without departing from the spirit of my invention, which consists in employing a metal carbid or metal-carbon-containing compound as electrode in the reduction of metals from their compounds.

The electrode may consist of a mixture of calcium or other carbid with carbon or other binder, or may consist wholly of the carbid, the essential feature being that the electrode contains a carbid of some form. Instead of metal oxy-fluorid or its equivalent, I can employ any other oxy-haloid or any substance containing metal and two or more electro-negative elements, or a metal oxid *per se*, so long as the electro-negative elements are capable of combining with the elements of the carbid electrode.

Figure 2:
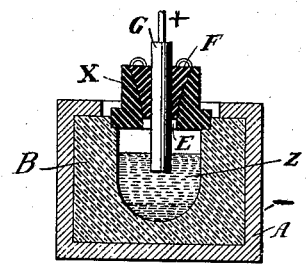
Figure 3:
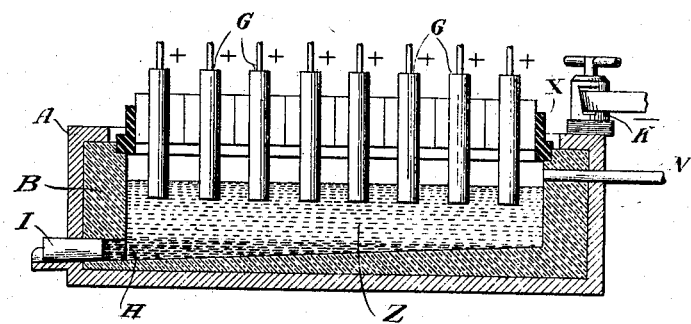

The apparatus which I prefer to employ in carrying out my process for reducing metals, is illustrated in the accompanying drawing, in which:

Figure 1 is a plan or top view; Fig. 2 is a transverse vertical section; and Fig. 3 is a longitudinal vertical section.

Referring to the drawing, the letter A designates a box or receptacle preferably of cast-iron, lined with a conductive substance B, such as carbon.

The material to be reduced is introduced into the apparatus through the openings E, which are closed by the insulating covers or plugs F passing into the insulating cover X, through which passes the electrode G, which consists of or contains a carbid and is adapted to be employed as anode during the process of electro-chemical reduction.

In the operation of the process, I place in the receptacle Z a quantity of aluminium oxid and aluminium fluorid and fuse the same by passing a current of electricity therethrough, between the carbon lining B, of the receptacle A, and the electrode G, having first started an electric arc between the same by placing them in contact and gradually separating them, and feed the aluminium oxid and aluminium fluorid in at intervals as it fuses, and continue to add the mixture until the interior of the apparatus has been sufficiently filled; I then add to the molten content a small quantity of calcium chlorid to assist the fluidity of the mixture, and on continuing the current a reducing action is set up between the carbid contained in the electrode G, such as calcium carbid, and the electro-negative constituents, fluorin and oxygen of the aluminium fluorid and oxid supplied thereto, whereby they are removed, the fluorin combining with the calcium of the calcium carbid and the carbon liberated with the oxygen thereof, at the same time separating the metallic aluminium which accumulates in the bottom of the apparatus and is withdrawn from time to time through the tap-hole H, by removing the tap-hole plug I. The carbon oxid evolved during the reduction of the carbon of the anode G with the oxygen of the substance reduced, escapes as gas through the conduit N.

By supplying new anodes G and fresh aluminium oxid and fluorid, from time to time, withdrawing the metal reduced and the accumulating fluorids, the process may be carried on continuously, so long as the materials are maintained in a molten condition, and if the substances are maintained in a molten condition by means supplied external of the electrode G by passing an alternating electric current therethrough, or otherwise, an electric circuit may be established and the current generated during the reduction of the metal and dissolution of the carbid anode G by connecting the apparatus B through the binding contact K with the electrode G, may be utilized in any convenient manner.

It should be noted in connection with the foregoing, that metallic carbids during their formation, absorb large quantities of heat energy, which energy is evolved upon decomposition. These compounds are generally termed endothermic compounds for this reason.

Alloys of aluminium and other metals may be produced by employing compounds of the metal, the alloy of which is desired, in place of aluminium compounds, so long as the electro-negative constituent of the metal, an alloy of which is desired, has sufficient affinity to the carbid anode to displace the same, whereby the two metals may be liberated by the concurrent combination of their electro-negative constituents with the carbid, readily uniting to produce alloys thereof.

The term "carbid," as employed throughout this specification and claims has particular reference to unions of metal with carbon of any atomicity, be it normal carbid, acetylid, or other metal-carbon-containing compound, so long as the metal-carbon-containing compound exists in a form capable of being utilized in accordance with the process herein set forth.

The term "metal-carbon-containing compound," employed herein, is intended to imply and does imply a distinct chemical compound containing chemically combined elements, of which metal and carbon are essentials, and said expression is to be interpreted to the full extent and with the full meaning of the terms relating to such compounds as broadly set forth in the specification of the original application, filed April 18, 1903, Serial No. 153,329, of which the present application is a division, as before stated, as being "substances containing metal and carbon, either as carbid, acetylid, or other union," it being obvious that the said metal-carbon-containing compound employed as electrode must be a conductor of electricity, capable of being acted upon by the anion of the electrolyte, and physically permanent or stable in character, i. e., not thermally dissociated at the temperature required for electrolysis when employed as electrolytic electrode.

The expression "containing" employed in this specification and claims with reference to ingredients of the electrodes or anodes, such as metal-carbon-containing compounds, carbids, acetylids, etc., is intended to imply and does imply an electrode or anode either containing such ingredient in part, or comprising the same essentially, or *per se.*

It is not intended herein to include or cover such carbids as are known as methids of which the only known aluminium carbid is a species and which evolve methane on decomposition with water, in contradistinction to and from acetylids which evolve acetylene upon aqueous decomposition, and which species of methid is specifically revealed and claimed in my United States Patent No. 881,049, dated March 3, 1908.

Having now described my invention, what I claim as new and desire to secure by Letters Patent is:—

1. The process of reducing metal, which consists in exposing a substance containing metal to electrolysis, while employing an electrode containing a metal acetylid decomposable by an ingredient of the substance employed and capable of liberating metal therefrom.

2. The process of reducing metal, which consists in exposing a substance containing metal and one or more non-metallic elements to electrolysis, while employing an electrode containing a metal acetylid decomposable thereby and capable of liberating metal therefrom.

3. The process of reducing metal, which consists in exposing a substance containing metal, oxygen, and a haloid, to electrolysis, while employing an electrode containing a metal acetylid decomposable thereby and capable of liberating metal therefrom.

4. The process of reducing metal, which consists in exposing a substance containing metal and oxygen to electrolysis, while employing an electrode containing a metal acetylid decomposable thereby and capable of liberating metal therefrom.

5. The process of reducing metal, which consists in exposing a substance containing metal and one or more non-metallic elements, while in a fused condition, to the action of electrodes containing a metal acetylid decomposable thereby and capable of liberating metal therefrom, and an electric current.

6. The process of reducing metal, which consists in fusing a compound, containing a metal and one or more electro-negative elements, and exposing it to the action of calcium acetylid decomposable thereby and capable of liberating metal therefrom, and an electric current.

7. The process of reducing metal, which consists in fusing a compound, containing a metal and one or more electro-negative elements, and exposing it to the combined action of calcium acetylid decomposable thereby and capable of liberating metal therefrom, and an electric current.

8. The process of reducing metal, which consists in exposing a compound of metal with one or more electro-negative elements while in contact with calcium acetylid, capable of liberating the metal, and in a fused condition, to the action of an electric current.

9. The process of reducing metal, which consists in exposing a fused compound, containing metal and one or more electro-negative elements, to an electrode containing calcium acetylid capable of liberating the metal and an electric current.

10. The process of reducing metal, which consists in exposing a substance containing the metal to electrolysis, while employing an electrode containing calcium acetylid decomposable by an ingredient of the substance employed and capable of liberating metal therefrom.

11. The process of reducing metal, which consists in exposing a substance containing metal and two or more non-metallic elements, capable of uniting with an element of an acetylid, to the action of an electrode containing calcium acetylid.

12. The process of reducing metal, which consists in exposing a substance containing metal, oxygen, and a haloid to electrolysis, while employing an electrode containing calcium acetylid.

13. The process of reducing metal, which consists in exposing a fused substance, containing metal capable of being liberated by calcium acetylid, and oxygen, to electrolysis, while employing an electrode containing calcium acetylid.

14. The process of reducing metal, which consists in electrolyzing a molten substance containing metal, capable of being liberated by calcium acetylid, with an anode containing calcium acetylid.

15. The process of reducing metal, which consists in electrolyzing a substance containing metal and two or more electronegative elements, capable of uniting with an element of calcium acetylid, with an anode containing calcium acetylid.

16. The process of reducing metal, which consists in electrolyzing a substance containing metal, oxygen, and a haloid, with an anode containing calcium acetylid.

17. The process of reducing metal, which consists in electrolyzing a substance containing metal, oxygen, and fluorin, with an anode containing calcium acetylid.

18. The process of reducing metal, which consists in electrolyzing a molten substance containing metal, capable of being liberated by a metal acetylid, with an anode containing a metal acetylid.

19. The process of reducing metal, which consists in electrolyzing a molten substance containing metal, capable of being liberated by an acetylid, with an anode containing an acetylid.

20. The process of reducing metal, which consists in electrolyzing a molten substance containing metal, capable of being liberated by an element of calcium carbid, with an anode containing calcium carbid.

21. The process of reducing metal, which consists in electrolyzing a fused substance containing metal and one or more electro-negative elements, capable of combining with an element of calcium carbid and liberating metal, with an anode containing calcium carbid.

22. The process of reducing metal, which consists in electrolyzing a substance containing metal, oxygen, and a haloid, with an anode containing calcium carbid.

23. The process of reducing metal, which consists in electrolyzing a substance containing metal, oxygen, and fluorin, with an anode containing calcium carbid.

24. The process of reducing metal, which consists in electrolyzing a molten substance containing metal and one or more electronegative elements, capable of combining with an element of an acetylid and liberating metal, with an anode containing an acetylid.

25. The process of reducing metal, which consists in electrolyzing a molten substance containing metal and one or more electronegative elements, capable of combining with an element of a metal acetylid and liberating metal, with an anode containing a metal acetylid.

26. The process of reducing metal, which consists in electrolyzing a molten bath with an anode containing an acetylid, said bath comprising a salt and an oxid of the desired metal.

27. The process of reducing metal, which consists in electrolyzing a molten bath with an anode containing an acetylid, said bath comprising a halogen salt and an oxid of the desired metal.

28. The process of reducing metal, which consists in electrolyzing a molten bath with an anode containing an acetylid, said bath comprising a fluorin salt and an oxid of the desired metal.

29. The process of reducing metal, which consists in electrolyzing a molten bath with an anode containing a metal acetylid, said bath comprising a salt and an oxid of the desired metal.

30. The process of reducing metal, which consists in electrolyzing a molten bath with an anode containing a metal acetylid, said bath comprising a halogen salt and an oxid of the desired metal.

31. The process of reducing metal, which consists in electrolyzing a molten bath with an anode containing a metal acetylid, said bath comprising a fluorin salt and an oxid of the desired metal.

32. The process of reducing metal, which consists in electrolyzing a molten bath with an anode containing calcium carbid, said bath comprising a salt and an oxid of the desired metal.

33. The process of reducing metal, which consists in electrolyzing a molten bath with an anode containing calcium carbid, said bath comprising a halogen salt and an oxid of the desired metal.

34. The process of reducing metal, which consists in electrolyzing a molten bath with an anode containing calcium carbid, said bath comprising a fluorin salt and an oxid of the desired metal.

In testimony whereof I affix my signature in presence of two witnesses.

HENRY SPENCER BLACKMORE.

Witnesses:
F. A. MILLIGAN,
J. R. NOTTINGHAM.